US012682525B2

(12) United States Patent
Won et al.

(10) Patent No.: US 12,682,525 B2
(45) Date of Patent: *Jul. 14, 2026

(54) METHOD FOR PROVIDING AVATAR AND ELECTRONIC DEVICE SUPPORTING THE SAME

(71) Applicant: Samsung Electronics Co., Ltd., Suwon-si (KR)

(72) Inventors: Hyunsuk Won, Suwon-si (KR); Seongsin Kwak, Suwon-si (KR); Sungoh Kim, Suwon-si (KR); Byungjun Son, Suwon-si (KR); Yanggeun Oh, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,880

(22) Filed: May 20, 2024

(65) Prior Publication Data

US 2024/0303895 A1 Sep. 12, 2024

Related U.S. Application Data

(63) Continuation of application No. 17/852,856, filed on Jun. 29, 2022, now Pat. No. 12,026,816, which is a
(Continued)

(30) Foreign Application Priority Data

Jul. 12, 2021 (KR) ........................ 10-2021-0091112

(51) Int. Cl.
*G06T 13/40* (2011.01)
*G06T 19/20* (2011.01)

(52) U.S. Cl.
CPC .............. *G06T 13/40* (2013.01); *G06T 19/20* (2013.01); *G06T 2207/30201* (2013.01)

(58) Field of Classification Search
CPC .................... G06T 13/40; G06T 19/20; G06T 2207/30201
See application file for complete search history.

(56) References Cited

U.S. PATENT DOCUMENTS 10,362,219 B2 7/2019 Wilson et al.
2006/0143569 A1 6/2006 Kinsella et al.
(Continued)

FOREIGN PATENT DOCUMENTS

KR 10-2019-0101832 A 9/2019
KR 10-2019-0139962 A 12/2019
(Continued)

OTHER PUBLICATIONS

International Search Report dated Sep. 21, 2022, issued in International Patent Application No. PCT/KR2022/008878.
(Continued)

*Primary Examiner* — Charles Tseng
(74) *Attorney, Agent, or Firm* — Jefferson IP Law, LLP

(57) ABSTRACT

An electronic device is provided. The electronic device includes a memory and at least one processor. The at least one processor may be configured to determine at least one image including a first face corresponding to a designated face, among one or more images stored in the memory, obtain first values of a plurality of attributes related to the first face, compare, for each attribute, the first values of plurality of attributes related to the first face with second values of a plurality of attributes corresponding to graphic objects constituting an avatar, the graphic objects being stored in the memory, identify whether at least one first attribute exists among the plurality of attributes related to the first face, the at least one first attribute having a first
(Continued)

value among the first values, a difference between the first value and a second value of the at least one first attribute being equal to or greater than a threshold, the second value being included the second values, and based on identifying that at least one first attribute exists among the plurality of attributes related to the first face, update the avatar, based on the first value of the at least one first attribute.

20 Claims, 9 Drawing Sheets

Related U.S. Application Data continuation of application No. PCT/KR2022/008878, filed on Jun. 22, 2022.

(56)                   References Cited

U.S. PATENT DOCUMENTS

| | | |
|---|---|---|
| 2009/0210486 A1 | 8/2009 | Lim |
| 2012/0106796 A1 | 5/2012 | Jones et al. |
| 2016/0006987 A1 | 1/2016 | Li et al. |
| 2016/0361653 A1 | 12/2016 | Zhang et al. |
| 2017/0053186 A1 | 2/2017 | Allen et al. |
| 2018/0024726 A1 | 1/2018 | Hviding |
| 2018/0335927 A1 | 11/2018 | Anzures et al. |
| 2019/0026954 A1* | 1/2019 | Vats .......................... G06T 13/40 |
| 2019/0266775 A1 | 8/2019 | Lee et al. |
| 2019/0339847 A1 | 11/2019 | Scapel et al. |
| 2020/0265627 A1 | 8/2020 | Seo et al. |
| 2020/0402304 A1 | 12/2020 | Hwang et al. |
| 2022/0084168 A1 | 3/2022 | Lee et al. |
| 2023/0298242 A1* | 9/2023 | Djuric ..................... G06T 17/00 |
| | | 345/419 |

FOREIGN PATENT DOCUMENTS

| | | |
|---|---|---|
| KR | 10-2020-0046417 A | 5/2020 |
| KR | 10-2020-0101630 A | 8/2020 |
| KR | 10-2020-0135538 A | 12/2020 |
| KR | 10-2022-0049689 A | 4/2022 |

OTHER PUBLICATIONS

Korean Office Action with English translation dated Dec. 19, 2025; Korean Appln. No. 10-2021-0091112.

* cited by examiner

101

METHOD FOR PROVIDING AVATAR AND ELECTRONIC DEVICE SUPPORTING THE SAME

CROSS-REFERENCE TO RELATED APPLICATION(S)

This application is a continuation of prior application Ser. No. 17/852,856, filed on Jun. 29, 2022, which is a U.S. National Stage application under 35 U.S.C. § 371 of an International application No. PCT/KR2022/008878, filed on Jun. 22, 2022, which is based on and claims the benefit of a Korean patent application number 10-2021-0091112, filed on Jul. 12, 2021, in the Korean Intellectual Property Office, the disclosure of which is incorporated by reference herein in its entirety.

TECHNICAL FIELD

The disclosure relates to a method for providing an avatar and an electronic device supporting the same.

BACKGROUND ART

An electronic device may provide various services using an avatar. The avatar may be a graphic icon or an animation character representing the user of the electronic device. The electronic device may provide a chatting service, a service through a game application, or a virtual education service, using the avatar.

The electronic device may obtain an image of the user (e.g., the user's face) and generate an avatar corresponding to the user, based on the obtained image.

The above information is presented as background information only to assist with an understanding of the disclosure. No determination has been made, and no assertion is made, as to whether any of the above might be applicable as prior art with regard to the disclosure.

DISCLOSURE

Technical Problem

The electronic device may generate an avatar based on a user input. For example, the electronic device may obtain an image for generating an avatar by obtaining an image for generating an avatar through a camera or selecting an image stored in a memory (e.g., a gallery application), based on a user input. The electronic device may generate an avatar based on the obtained image.

When the electronic device generates an avatar based on the user input, the generated avatar may not express the user's current appearance. For example, when the user changes her hair style (and/or mustache style), wears glasses (or takes off glasses), or gets plastic surgery on her face after the electronic device generated an avatar based on a user input in the past (e.g., a month ago), the generated avatar may not reflect the user's current look.

Aspects of the disclosure are to address at least the above-mentioned problems and/or disadvantages and to provide at least the advantages described below. Accordingly, an aspect of the disclosure is to provide a method for providing an avatar and an electronic device, which may provide an avatar representing a user's current appearance by automatically performing at least part of the operation of providing an avatar by an electronic device (e.g., by performing at least part of the operation of providing an avatar without a user input).

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a memory and at least one processor electrically connected with the memory. The at least one processor may be configured to determine at least one image including a first face corresponding to a designated face, among one or more images stored in the memory, obtain first values of a plurality of attributes related to the first face, compare, for each attribute, the first values of the plurality of attributes related to the first face with second values of a plurality of attributes corresponding to graphic objects constituting an avatar, the graphic objects being stored in the memory, identify whether at least one first attribute exists among the plurality of attributes related to the first face, the at least one first attribute having a first value among the first values, a difference between the first value and a second value of the at least one first attribute being equal to or greater than a threshold, the second value being included the second values, and based on identifying that at least one first attribute exists among the plurality of attributes related to the first face, update the avatar, based on the first value of the at least one first attribute.

In accordance with another aspect of the disclosure, a method for providing an avatar in an electronic device is provided. The method includes determining at least one image including a first face corresponding to a designated face, among one or more images stored in a memory of the electronic device, obtaining first values of a plurality of attributes related to the first face, comparing, for each attribute, the first values of the plurality of attributes related to the first face with second values of a plurality of attributes corresponding to graphic objects constituting an avatar, the graphic objects being stored in the memory, identifying whether at least one first attribute exists among the plurality of attributes related to the first face, the at least one first attribute having a first value among the first values, a difference between the first value and a second value of the at least one first attribute being equal to or greater than a threshold, the second value being included the second values, and based on identifying that at least one first attribute exists among the plurality of attributes related to the first face, updating the avatar, based on the first value of the at least one first attribute.

Advantageous Effects

According to various embodiments of the disclosure, a method for providing an avatar and an electronic device supporting the same may provide an avatar representing a user's current appearance by automatically performing at least part of the operation of providing an avatar by the electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
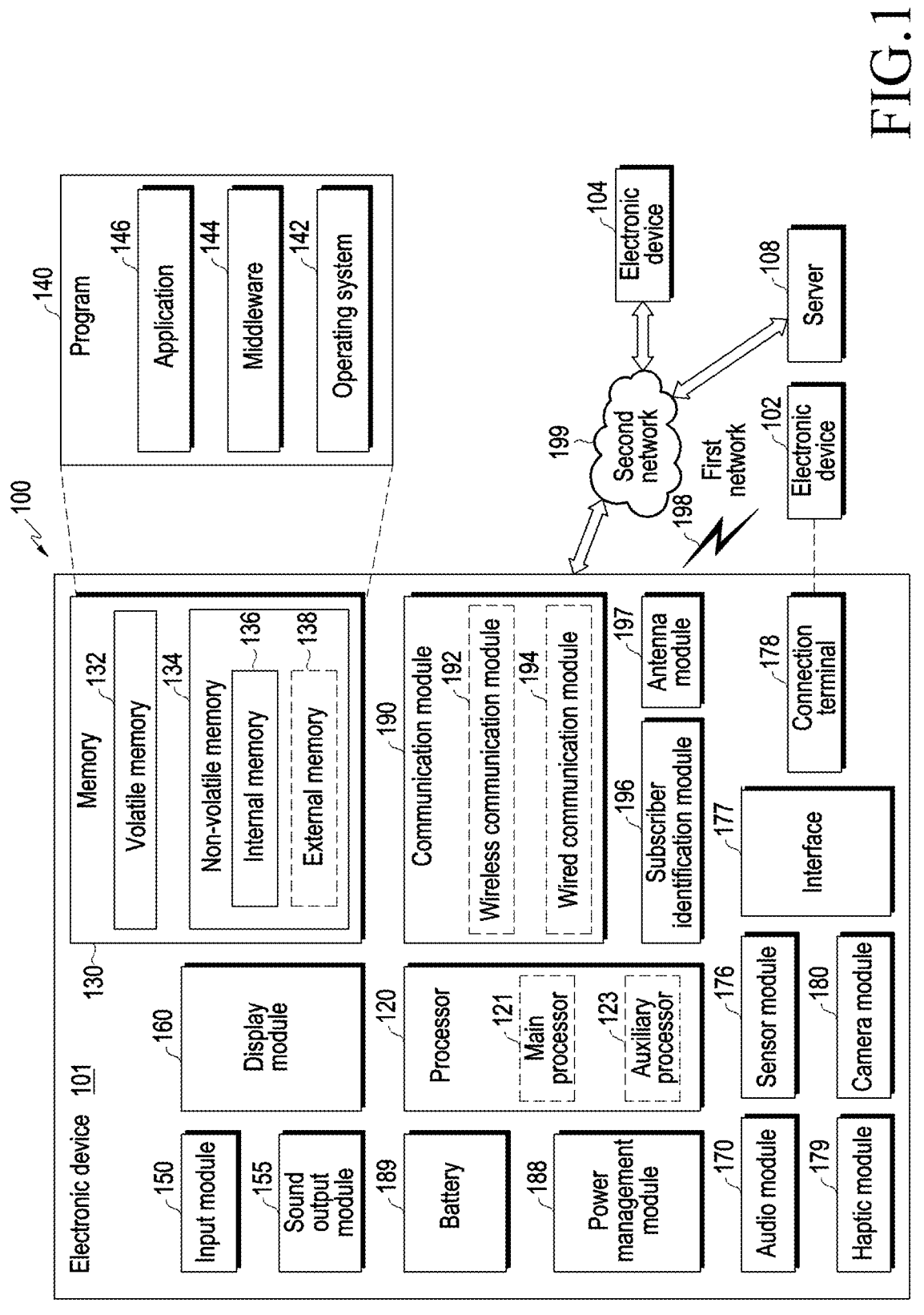
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a $5^{th}$ generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
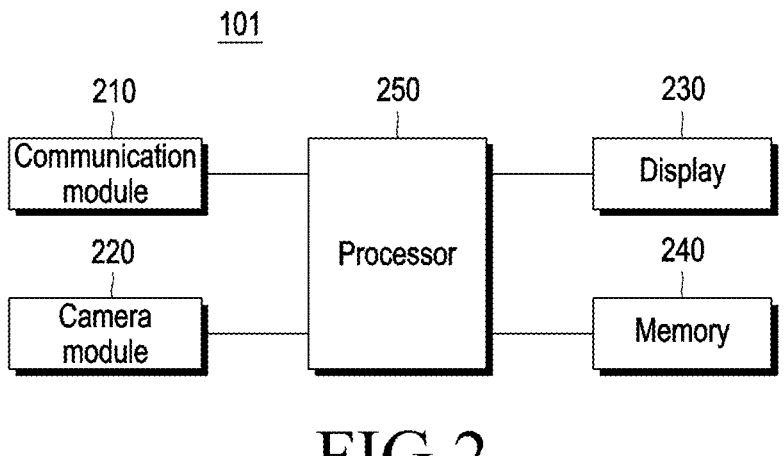
FIG. 2 is a block diagram illustrating an electronic device according to an embodiment of the disclosure.

FIG. 2 is a block diagram illustrating an electronic device according to an embodiment of the disclosure.

Referring to FIG. 2, in an embodiment, the electronic device 101 may include a communication module 210, a camera module 220, a display 230, a memory 240, and/or a processor 250.

In an embodiment, the communication module 210 may be included in the communication module 190 of FIG. 1.

In an embodiment, the communication module 210 may transmit an image to an external electronic device (e.g., the electronic device 102 and/or the electronic device 104) or receive an image from the external electronic device. For example, the communication module 210 may transmit an image obtained by the electronic device 101 to the external electronic device or receive an image from the external electronic device so that the electronic device 101 and the external electronic device may share the image.

In an embodiment, the camera module 220 may be included in the camera module 180 of FIG. 1.

In an embodiment, the camera module 220 may obtain an image for providing an avatar. For example, the camera module 220 may obtain an image to update a previously generated avatar and stored in the memory 240 or to generate a new avatar.

In an embodiment, the display 230 may be included in the display module 160 of FIG. 1.

In an embodiment, when the avatar is updated or a new avatar is created, the display 230 may display the updated avatar or the created new avatar.

According to an embodiment, the memory 240 may be included in the memory 130 of FIG. 1.

In an embodiment, the memory 240 may store various information for performing an operation for providing an avatar. Various information stored in order for the memory 240 to provide an avatar is described below.

According to an embodiment, the processor 250 may be included in the processor 120 of FIG. 1.

According to an embodiment, the processor 250 may overall control the operation of providing an avatar. In an embodiment, the processor 250 may include one or more processors for performing the operation of providing an avatar.

In an embodiment, the processor 250 may include a plurality of components for performing the operation of providing an avatar. A plurality of components included in the processor 250 are described with reference to FIG. 3.

Although FIG. 2 illustrates an example in which the electronic device 101 includes the communication module 210, the camera module 220, the display 230, the memory 240, and/or the processor 250 in an embodiment, it is not limited thereto. For example, the electronic device 101 may not include the communication module 210, the display 230, and/or the camera module 220 according to an embodiment. As another example, the electronic device 101 may further include at least one component among the components of the electronic device 101 illustrated in FIG. 1.

Figure 3:
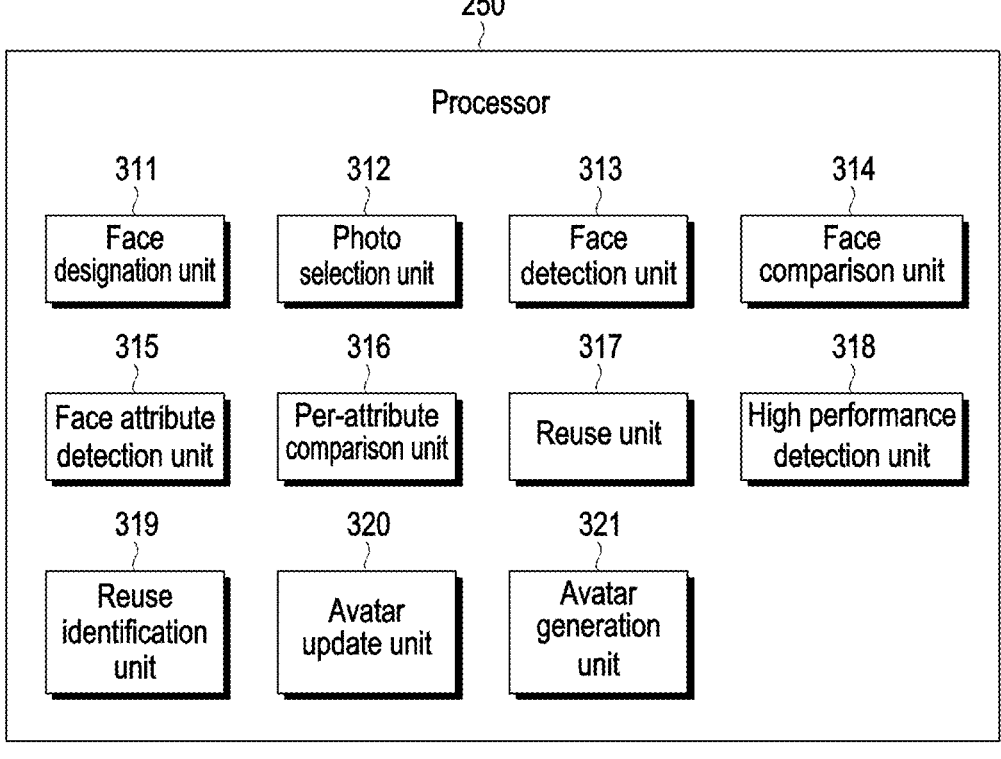
FIG. 3 is a block diagram illustrating a processor according to an embodiment of the disclosure.

FIG. 3 is a block diagram illustrating a processor according to an embodiment of the disclosure.

Referring to FIG. 3, in an embodiment, the processor 250 may include a face designation unit 311, a photo selection unit 312, a face detection unit 313, a face comparison unit 314, a face attribute detection unit 315, a per-attribute comparison unit 316, a reuse unit 317, a high performance detection unit 318, a reuse identification unit 319, an avatar update unit 320, and/or an avatar generation unit 321.

In an embodiment, the face designation unit 311, the photo selection unit 312, the face detection unit 313, the face comparison unit 314, the face attribute detection unit 315, the per-attribute comparison unit 316, the reuse unit 317, the high performance detection unit 318, the reuse identification unit 319, the avatar update unit 320, and/or the avatar generation unit 321 may be software modules that are stored in the memory 240 and loaded and executed by the processor 250.

In an embodiment, the face designation unit 311 may perform an operation for designating the user (e.g., the user's face) for providing an avatar.

In an embodiment, when a user input for designating the face is received, the face designation unit 311 may display a representative image corresponding to the user of the electronic device through the display 230. For example, when an application for providing an avatar is executed, the face designation unit 311 may display a representative image including the user's face of the electronic device through the display 230. The face designation unit 311 may designate the face included in the representative image as a face for providing an avatar, based on an input to the representative image (e.g., a user input for designating the face included in the representative image as the designated face). However, without being limited thereto, the face designation unit 311 may designate the face included in an image selected by a user input from among one or more images stored in the memory 240, as the face for providing an avatar.

In an embodiment, the face designation unit 311 may display a plurality of images individually corresponding to a plurality of users (hereinafter, denoted as a 'plurality of representative images') through the display 230. For example, when an application for providing an avatar is executed, the face designation unit 311 may display, through the display 230, a representative image including a user's face (e.g., an image portion for the user's face in the image or an object representing the user's face in the image) for each of the plurality of users.

In an embodiment, the face designation unit 311 may determine the latest obtained image, among at least one image including the user's face for each of the plurality of users, as the user's representative image. However, a method for determining the user's representative image by the face designation unit 311 is not limited to the above-described example.

In an embodiment, the face designation unit 311 may select a representative image (e.g., one representative image) based on a user input from among a plurality of representative images and designate the face included in the selected representative image as a face for providing an avatar. Hereinafter, the face included in the selected representative image is denoted as a 'designated face.' In an embodiment, when a face for providing an avatar is designated, the designation of the designated face may be maintained until before a user input (e.g., a user input for designating another user's face (or the user's other face)) is made. For example, when a face for providing an avatar is designated, the face designation unit 311 may perform the operation for providing an avatar using the designated face until before a user input for selecting a representative image including another user's face is made to designate the other user's face (or the user's other face).

In an embodiment, the face designation unit 311 may designate the face included in an image selected by the user from among one or more images stored in the memory 240, as the face for providing an avatar.

In an embodiment, the photo selection unit 312 may select at least one image (hereinafter, denoted as 'at least one candidate image') including a face (e.g., an image portion for the face in the image or an object representing the face in the image) from among one or more images stored in the memory 240.

In an embodiment, the at least one candidate image may include a still image and/or a dynamic image (e.g., a video). For example, the at least one candidate image may be at least one image including a face among a plurality of image frames included in a video.

In an embodiment, the photo selection unit 312 may select at least one image obtained most recently and including a face, as the at least one candidate image, from among one or more images stored in the memory 240.

In an embodiment, the photo selection unit 312 may select at least one image, as at least one candidate image, from among one or more images stored in the memory 240, based on additional information.

For example, the photo selection unit 312 may identify the number of times in which an image is displayed through the display 230 (e.g., the number of times in which the image is viewed by the user through a gallery application) while the gallery application is running, for each of one or more images stored in the memory 240. The photo selection unit 312 may select at least one image displayed a designated number of times, more times or most times, as at least one candidate image, from among one or more images stored in the memory 240.

As another example, the photo selection unit 312 may identify whether a designated function (e.g., an image edit function or a function for enhancing image quality of image) has been performed (or applied) (and/or the number of times in which the designated function has been performed) on each of one or more images stored in the memory 240. The photo selection unit 312 may select at least one image, for which the designated function has been performed (or the designated function has been performed a designated number of times, more times or most times), as at least one candidate image, from among one or more images stored in the memory 240.

As another example, the photo selection unit 312 may identify whether the electronic device 101 has shared an image with an external electronic device (and/or the number of times in which the electronic device 101 has shared the image with the external electronic device) for each of one or more images stored in the memory 240. The photo selection unit 312 may select the at least one image, which the electronic device 101 has shared with the external electronic device (and/or which the electronic device 101 has shared with the external electronic device a designated number of times, more times or most times), as at least one candidate image, from among one or more images stored in the memory 240.

As another example, the photo selection unit 312 may identify whether at least some of one or more images stored in the memory 240 include the same looking face (a face having a same appearance) (e.g., a face with glasses or sun glasses worn or taken off, a face with a hat worn (or taken off), or a face with a hair product applied). The photo selection unit 312 may select at least one image including the same looking face as at least one candidate image. Or, the photo selection unit 312 may identify the number of at least one image (or number of occurrences of the same looking face) including the same looking face, obtained within a designated period (e.g., within one week from the present). If the number of at least one image including the same looking face obtained within the designated period is a designated number or more, the photo selection unit 312 may select at least one image including the same looking face as at least one candidate image.

In an embodiment, the photo selection unit 312 may select at least one image as at least one candidate image from one or more images stored in the memory 240, by combining the number of times in which an image is displayed through the display 230 while a gallery application is running, whether a designated function has been performed on an image (and/or the number of times in which the designated function has been performed), whether an image has been shared with an external electronic device (and/or the number of times in which the electronic device 101 has shared an image with the external electronic device), whether at least some of one or more images stored in the memory 240 include the same looking face, and the number of at least one image including the same looking face obtained within a designated period.

In an embodiment, the photo selection unit 312 may set a priority on the number of times in which an image is displayed through the display 230 while a gallery application is running, whether a designated function has been performed on an image (and/or the number of times in which the designated function has been performed), whether an image has been shared with an external electronic device (and/or the number of times in which the electronic device 101 has shared an image with the external electronic device), whether at least some of one or more images stored in the memory 240 include the same looking face, and the number of at least one image including the same looking face obtained within a designated period. The photo selection unit 312 may select at least one image (e.g., a designated number of images high in priority) among one or more images stored in the memory 240, as at least one candidate image.

In an embodiment, the face detection unit 313 may detect a face (e.g., an area including the face in the image, an image portion for the face in the image, or an object representing the face in the image) from each of the at least one candidate image. The face detection unit 313 may extract feature points in the detected face. The face detection unit 313 may obtain vectors (or also denoted as 'feature vectors') individually corresponding to the extracted feature points by normalizing the face based on the extracted feature points. In an embodiment, the face detection unit 313 may perform the above-described operations based on an artificial intelligence model or a designated algorithm.

In an embodiment, the face comparison unit 314 may determine whether the face included in at least one candidate image corresponds to a designated face by comparing the designated face (e.g., a face designated by the face designation unit 311) and the face included in at least one candidate image. For example, the face comparison unit 314 may calculate similarities between feature points (e.g., feature vectors) of the designated face and the feature points of the face included in at least one candidate image. When the calculated similarity is a designated threshold or more, the face comparison unit 314 may determine that the face included in the at least one candidate image corresponds to the designated face (e.g., determine that the figure with the face included in the at least one candidate image and the figure with the designated face are the same). When the calculated similarity is less than the designated threshold, the face comparison unit 314 may determine that the face included in at least one candidate image does not correspond to the designated face (e.g., determine that the figure with the face included in the at least one candidate image and the figure with the designated face are different). In an embodiment, when the face included in at least one candidate image is determined not to correspond to the designated face, the face comparison unit 314 may enable the photo selection unit 312 to again perform the operation of selecting at least one candidate image including a face, from among one or more images stored in the memory 240 (e.g., one or more images stored in the memory 240 except for the at least one candidate image including the face determined not to correspond to the designated face). However, without limited thereto, in an embodiment, when the face included in at least one candidate image is determine not to correspond to the designated face, the face comparison unit 314 may stop the operation of providing an avatar (e.g., the operation of updating the avatar or creating a new avatar) for a designated time. For example, when the face included in at least one candidate image is determined not to correspond to the designated face, the face comparison unit 314 may not perform the operation of providing an avatar until a designated number of images are obtained or a designated time elapses.

In an embodiment, the face attribute detection unit 315 may obtain (e.g., detect) values of a plurality of attributes (e.g., values indicated by the plurality of attributes) of elements constituting the face, in at least one candidate image including the face (hereinafter, denoted as a 'first face') determined to correspond to the designated face (hereinafter, denoted as 'at least one image including a first face').

In an embodiment, the plurality of attributes related to the elements constituting the face may include the shape, size, color (e.g., the color of the elements constituting the face, the skin color, and/or the color of the iris) of the elements (e.g., the face shape (contour of the face), eyes, nose, ears, mouth, chicks, chin, forehead, back of head, temporal regions, hair, mustache, spots, wearable items (e.g., glasses, sun glasses, or hat), hat, eyebrows, age, gender, and/or race) constituting the face (or the shape of the face), relative positions of the elements constituting the face, and/or relative size proportions of the elements constituting the face.

In an embodiment, the face attribute detection unit 315 may obtain the values of a plurality of internal attributes in at least one image including the first face, using an artificial intelligence model or a designated algorithm.

In an embodiment, the per-attribute comparison unit 316 may compare, for each attribute, the values of a plurality of attributes related to the first face included in at least one image including the first face and the values of a plurality of attributes corresponding to graphic objects constituting an avatar (e.g., an avatar updated most recently or a newly created avatar) stored in the memory 240.

In an embodiment, the per-attribute comparison unit 316 may calculate differences between the values of the plurality of attributes related to the first face included in at least one image including the first face and the values of the plurality of attributes corresponding to the graphic objects constituting the avatar stored in the memory 240, for each attribute. In an embodiment, the per-attribute comparison unit 316 may identify whether each of the calculated differences is a designated threshold or more.

In an embodiment, the reuse unit 317 may determine whether to reuse at least some of the values of the plurality of attributes corresponding to the graphic objects constituting the avatar stored in the memory 240, based on whether each of the differences calculated by the per-attribute comparison unit 316 is the designated threshold or more. For example, the reuse unit 317 may identify at least one attribute (hereinafter, denoted as 'at least one first attribute'), for which differences from the values of the plurality of attributes corresponding to graphic objects constituting the avatar stored in the memory 240, among the values of the plurality of attributes related to the first face, are the designated threshold or more, and/or attributes (hereinafter, denoted as 'at least one second attribute'), for which differences from the values of the plurality of attributes corresponding to the graphic objects constituting the avatar stored in the memory 240 are less than the designated threshold.

In an embodiment, the reuse unit 317 may determine not to reuse the graphic object of the avatar stored in the memory 240, corresponding to at least one first attribute to update the avatar or create a new avatar for the at least one first attribute. For example, the reuse unit 317 may determine to use the value of the at least one first attribute related to the first face to update the avatar or create a new avatar. In an embodiment, the reuse unit 317 may set a flag value indicate to reuse the value of the at least one first attribute related to the first face to update the avatar or create a new avatar (e.g., set the flag value corresponding to the at least one first attribute to '0').

In an embodiment, the reuse unit 317 may determine to reuse the graphic object of the avatar stored in the memory 240, corresponding to at least one second attribute, for the at least one second attribute. For example, to update the avatar, the reuse unit 317 may determine to reuse the graphic object of the avatar stored in the memory 240, corresponding to at least one second attribute, without using the value of the at least one second attribute related to the first face. In an embodiment, to update the avatar, if the value of the at least one second attribute related to the first face is not used, the operation of matching (e.g., mapping) the value of at least one second attribute related to the first face to the graphic object (e.g., the size, shape, and/or color of the graphic object corresponding to the at least one second attribute among the plurality of graphic objects constituting the avatar) constituting the avatar may be skipped. In an embodiment, to update the avatar, if the value of the second attribute related to the first face is not used, although the avatar stored in the memory 240 is updated, the graphic object corresponding to the at least one second attribute in the updated avatar may not be updated. In an embodiment, the reuse unit 317 may set a flag value indicating to reuse the graphic object of the avatar stored in the memory 240, corresponding to the at least one second attribute, for the at least one second attribute (e.g., set the value of the flag corresponding to the at least one second attribute to '1').

In an embodiment, the high performance detection unit 318 may obtain (e.g., detect) a more detailed (e.g., more accurate or detailed) value of the at least one first attribute, for which the differences from the values of the plurality of attributes corresponding to the graphic objects constituting the avatar stored in the memory 240 are the designated threshold or more, among the values of the plurality of attributes related to the first face. For example, the high performance detection unit 318 may obtain the more detailed value of the at least one first attribute, using an artificial intelligence model or algorithm capable of obtaining a more detailed value of an attribute (or having better performance), as compared with the artificial intelligence model or algorithm used to obtain the values of the plurality of attributes related to the first face by the face attribute detection unit 315. For example, the high performance detection unit 318 may obtain the more detailed value of the at least one first attribute, using an artificial intelligence model implemented with more hidden layers and/or nodes than the hidden layers and/or nodes of the artificial intelligence model used to obtain the values of the plurality of attributes related to the first face by the face attribute detection unit 315.

In an embodiment, the reuse identification unit 319 may determine whether to perform the operation of updating the avatar stored in the memory 240, the operation of creating a new avatar, or to maintain the avatar stored in the memory 240 (e.g., skipping the operation of updating the avatar stored in the memory 240 or creating a new avatar).

For example, when all of the plurality of attributes related to the first face correspond to the at least one first attribute (e.g., when it is determined to reuse none of the plurality of attributes related to the first face by the reuse unit 317), the reuse identification unit 319 may determine to perform the operation of creating a new avatar. When the values of the flags individually corresponding to the plurality of attributes related to the first face all are set to '0,' the reuse identification unit 319 may determine to perform the operation of creating a new avatar.

As an example, when some of the plurality of attributes related to the first face correspond to the at least one first attribute, the reuse identification unit 319 may determine to perform the operation of updating the avatar. When some of the values of the flags individually corresponding to the plurality of attributes related to the first face are set to '0,' the reuse identification unit 319 may determine to perform the operation of updating the avatar.

As another example, when all of the plurality of attributes related to the first face correspond to the at least one second attribute (e.g., when it is determined to reuse the plurality of attributes related to the first face by the reuse unit 317), the reuse identification unit 319 may determine to maintain the avatar stored in the memory 240. When the values of the flags individually corresponding to the plurality of attributes related to the first face all are set to '1,' the reuse identification unit 319 may determine to maintain the avatar stored in the memory 240. In an embodiment, when the reuse identification unit 319 determines to maintain the avatar stored in the memory 240, the reuse identification unit 319 may not perform the operation of providing an avatar until before a designated number of images are obtained in addition to the currently stored images or a designated time elapses. In an embodiment, when the reuse identification unit 319 determines to maintain the avatar stored in the memory 240, the operation of selecting at least one candidate image including a face from among one or more images stored in the memory 240 (e.g., one or more images stored in the memory 240, except for the at least one image including the first area) and the operations performed by the reuse identification unit 319 (e.g., the operation of updating the avatar stored in the memory 240, the operation of creating a new avatar, or the operation of determining whether to maintain the avatar stored in the memory 240) may be performed again (e.g., repeatedly).

In an embodiment, the avatar update unit 320 may update the avatar stored in the memory 240. In an embodiment, the avatar update unit 320 may update at least one first attribute among the plurality of attributes related to the first face (e.g., at least one attribute, for which the differences from the values of the plurality of attributes corresponding to the graphic objects constituting the avatar stored in the memory 240, among the values of the plurality of attributes related to the first face, are the designated threshold or more). In an embodiment, the avatar update unit 320 may not update at least one second attribute among the plurality of attributes related to the first face (e.g., attributes having a value, for which the differences from the values of the plurality of attributes corresponding to the graphic objects constituting the avatar stored in the memory 240 are less than the designated threshold).

In an embodiment, the avatar update unit 320 may obtain a graphic object (graphic object is also denoted as an 'asset') corresponding to (e.g., mapped to) the value of at least one first attribute of the first face, from the memory 240. For example, the avatar update unit 320 may obtain the graphic object corresponding to the more detailed value of the at least one first attribute of the first face obtained through the high performance detection unit 318, from the memory 240. As another example, the avatar update unit 320 may obtain the graphic object corresponding to the value of the at least one first attribute of the first face obtained through the face attribute detection unit 315, from the memory 240.

In an embodiment, the avatar update unit 320 may update the avatar stored in the memory 240 by merging (e.g., blending) the graphic object having the size, shape, and/or color corresponding to the value of the at least one first attribute of the first face and the graphic object corresponding to the remaining attributes except for the at least one first attribute among the plurality of graphic objects constituting the avatar stored in the memory 240. In an embodiment, the avatar update unit 320 may update the avatar stored in the memory 240 by replacing (or changing to) the graphic object corresponding to the at least one first attribute among the plurality of graphic objects constituting the avatar stored in the memory 240, with the graphic object having the size, shape, and/or color corresponding to the value of the at least one first attribute of the first face.

In an embodiment, the avatar generation unit 321 may create a new avatar.

In an embodiment, the avatar generation unit 321 may obtain a plurality of graphic objects individually corresponding to the values of the plurality of attributes related to the first face, from the memory 240. For example, the avatar generation unit 321 may obtain a plurality of graphic objects corresponding to more detailed values of the plurality of attributes related to the first face obtained through the high performance detection unit 318, from the memory 240. As another example, the avatar generation unit 321 may obtain a plurality of graphic objects corresponding to the values of the plurality of attributes related to the first face obtained through the face attribute detection unit 315, from the memory 240.

In an embodiment, the avatar generation unit 321 may create a new avatar by merging the plurality of graphic objects having the size, shape, and/or color, individually corresponding to the values of the plurality of attributes related to the first face.

In an embodiment, when the avatar is updated or a new avatar is created, the processor 250 may store the updated avatar or created avatar in the memory 240.

In an embodiment, at least some of the components of the processor 250 shown in FIG. 3 may be integrated.

In an embodiment, the processor 250 may perform at least some of the functions of providing an avatar in the background. For example, when the function of providing an avatar is activated, the processor 250 may perform the remaining operations except for the operation by the face designation unit 311, without a user input (or automatically).

According to various embodiments of the disclosure, an electronic device 101 may comprise a memory 240 and at least one processor 250 electrically connected with the memory 240. The at least one processor 250 may be configured to determine at least one image including a first face corresponding to a designated face, among one or more images stored in the memory 240, obtain first values of a plurality of attributes related to the first face, compare, for each attribute, the first values of the plurality of attributes related to the first face with second values of a plurality of attributes corresponding to graphic objects constituting an avatar, the graphic objects being stored in the memory 240, identify whether at least one first attribute exists among the plurality of attributes related to the first face, the at least one first attribute having a first value among the first values, a difference between the first value and a second value of the at least one first attribute being equal to or greater than a threshold, the second value being included the second values, and based on identifying that at least one first attribute exists among the plurality of attributes related to the first face, update the avatar, based on the first value of the at least one first attribute.

According to various embodiments, the at least one processor 250 may be configured to update, based on the first value of the at least one first attribute, the avatar, based on the at least one first attribute being a portion of the plurality of attributes related to the first face.

According to various embodiments, the at least one processor 250 may be configured to create a new avatar, based on each of differences between the first values and the second values being equal to or greater than the threshold.

According to various embodiments, the at least one processor 250 may be configured to maintain the avatar, based on each of differences between the first values and the second values being less than the threshold.

According to various embodiments, the at least one processor 250 may be configured to obtain a detailed value of the at least one first attribute, based on identifying that the at least one first attribute exists among the plurality of attributes related to the first face and update the avatar, based on the detailed value of the at least one first attribute.

According to various embodiments, the at least one processor 250 may be configured to display a representative image including a face of a user of the electronic device through a display 230 of the electronic device 101 and designate the face included in the representative image as the designated face, based on a user input to the representative image.

According to various embodiments, the at least one processor 250 may be configured to select at least one candidate image among the one or more images stored in the memory 240, based on a number of times by which an image is displayed through a display 230 of the electronic device 101 while a gallery application is executed, whether a function designated for an image has been performed, whether an image has been shared with an external electronic device 101, whether at least some of the one or more images stored in the memory 240 include a same looking face, and/or a number of at least one image including a same looking face obtained within a designated period, detect a face in the at least one candidate image, and determine the at least one image by comparing the first face corresponding to the designated face and the detected face.

According to various embodiments, the at least one processor 250 may be configured to select at least one candidate image corresponding to the designated face among one or more images stored in the memory 240, and determine the at least one image among the at least one candidate image, based on a number of times by which an image is displayed through a display 230 of electronic device 101 while a gallery application is executed, whether a function designated for an image has been performed, whether an image has been shared with an external electronic device 101, whether at least some of the one or more images stored in the memory 240 include a same looking face, and/or a number of at least one image including a same looking face obtained within a designated period.

According to various embodiments, the at least one processor 250 may be configured to perform a function of providing the avatar in a background, based on whether a current battery level of the electronic device 101 is equal to or greater than a designated level, whether the electronic device 101 is currently being charged, whether a screen of the electronic device 101 is in an active state, a number of images obtained after a designated time, and/or a designated time.

According to various embodiments, the at least one processor 250 may be configured to output a notification indicating the avatar is updated, based on the avatar being updated.

Figure 4:
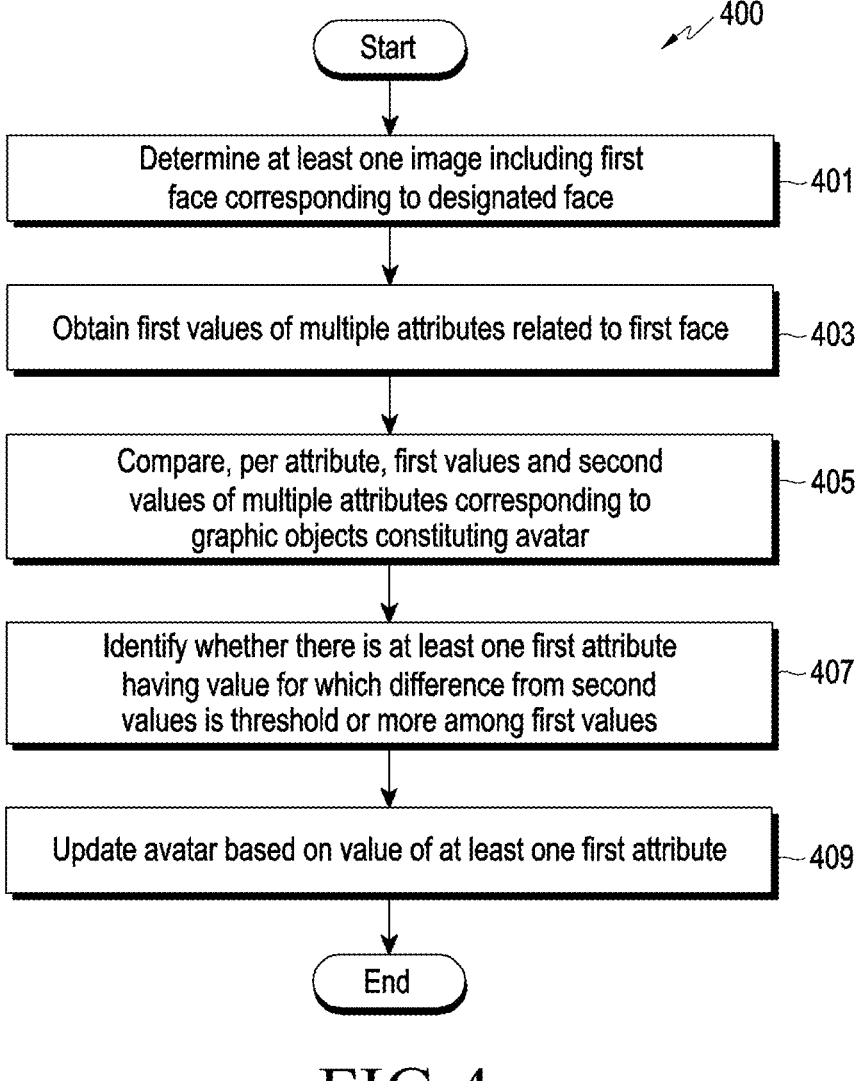
FIG. 4 is a flowchart illustrating a method for providing an avatar according to an embodiment of the disclosure.

FIG. 4 is a flowchart illustrating a method for providing an avatar according to an embodiment of the disclosure.

Referring to FIG. 4, in a method 400, in operation 401, in an embodiment, the processor 250 may determine at least one image including a first face corresponding to a designated face from among one or more images stored in the memory 240.

Hereinafter, the operation of determining at least one image including the first face corresponding to the designated face in operation 401 is described with reference to FIGS. 5 and 6.

Figure 5:
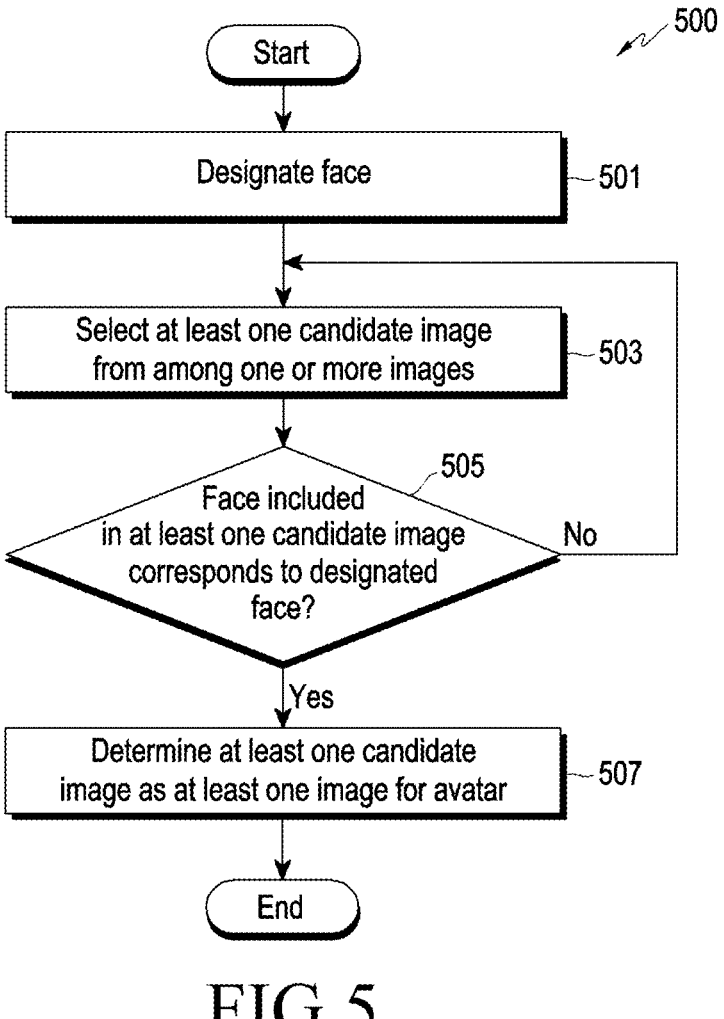
FIG. 5 is a view illustrating a method for determining an image for providing an avatar according to an embodiment of the disclosure.

FIG. 5 is a view 500 illustrating a method for determining an image for providing an avatar according to an embodiment of the disclosure.

In an embodiment, the operations of FIG. 5 may be operations included in operation 401 of FIG. 4.

Referring to FIG. 5, in operation 501, in an embodiment, the processor 250 may designate a face.

In an embodiment, when a user input for designating the face is received, the processor 250 may display a representative image corresponding to the user of the electronic device through the display 230. For example, when an application for providing an avatar is executed, the processor 250 may display a representative image including the user's face of the electronic device through the display 230. The processor 250 may designate the face included in the representative image as a face for providing an avatar, based on an input to the representative image (e.g., a user input for designating the face included in the representative image as the designated face). However, without limited thereto, the processor 250 may designate the face included in an image selected by a user input from among one or more images stored in the memory 240, as the face for providing an avatar.

In an embodiment, when a user input for designating the face is received, the processor 250 may display a plurality of representative images individually corresponding to a plurality of users through the display 230. For example, when an application for providing an avatar is executed, the processor 250 may display, through the display 230, a representative image including a user's face (e.g., an image portion for the user's face in the image or an object representing the user's face in the image) for each of the plurality of users.

In an embodiment, the processor 250 may determine the latest obtained image, among at least one image including the user's face for each of the plurality of users, as the user's representative image. However, a method for determining the user's representative image by the processor 250 is not limited to the above-described example.

In an embodiment, the processor 250 may select a representative image (e.g., one representative image) based on a user input from among a plurality of representative images and designate the face included in the selected representative image as a face for providing an avatar.

In an embodiment, when a face for providing an avatar is designated, the designation of the designated face may be maintained until before a user input (e.g., a user input for designating another user's face (or the user's other face)) is made. For example, when a face for providing an avatar is designated, the processor 250 may perform the operation for providing an avatar using the designated face until before a user input for selecting a representative image including another user's face is made to designate the other user's face (or the user's other face).

In an embodiment, the processor 250 may designate the face included in an image selected by the user from among one or more images stored in the memory 240, as the face for providing an avatar.

In operation 503, in an embodiment, the processor 250 may select at least one candidate image from among one or more images stored in the memory 240.

In an embodiment, the processor 250 may select at least one candidate image including a face (e.g., an image portion for the face in the image or an object representing the face in the image) from among one or more images stored in the memory 240.

In an embodiment, the at least one candidate image may include a still image and/or a dynamic image (e.g., a video). For example, the at least one candidate image may be at least one image including a face among a plurality of image frames included in a video.

In an embodiment, the processor 250 may select at least one image obtained most recently and including a face, as the at least one candidate image, from among one or more images stored in the memory 240.

In an embodiment, the processor 250 may select at least one image, as at least one candidate image, from among one or more images stored in the memory 240, based on additional information.

For example, the processor 250 may identify the number of times in which an image is displayed through the display 230 (e.g., the number of times in which the image is viewed by the user through a gallery application) while the gallery application is running, for each of one or more images stored in the memory 240. The processor 250 may select at least one displayed in a designated number of times or more or most times, as at least one candidate image, from among one or more images stored in the memory 240.

As another example, the processor 250 may identify whether a designated function (e.g., an image edit function or a function for enhancing image quality of image) has been performed (or applied) (and/or the number of times in which the designated function has been performed) on each of one or more images stored in the memory 240. The processor 250 may select at least one image, for which the designated function has been performed (or the designated function has been performed in a designated number or times or more or most times), as at least one candidate image, from among one or more images stored in the memory 240.

As another example, the processor 250 may identify whether the electronic device 101 has shared an image with an external electronic device (and/or the number of times in which the electronic device 101 has shared the image with the external electronic device) for each of one or more images stored in the memory 240. The processor 250 may select the at least one image, which the electronic device 101 has shared with the external electronic device (and/or which the electronic device 101 has shared with the external electronic device in a designated number of times or more or most times), as at least one candidate image, from among one or more images stored in the memory 240.

As another example, the processor 250 may identify whether at least some of one or more images stored in the memory 240 include the same looking face (e.g., a face with glasses or sun glasses worn or taken off, a face with a hat worn (or taken off), or a face with a hair product applied). The processor 250 may select at least one image including the same looking face as at least one candidate image. Or, the processor 250 may identify the number of at least one image (or number of occurrences of the same looking face) including the same looking face, obtained within a designated period (e.g., within one week from the present). If the number of at least one image including the same looking face obtained within the designated period is a designated number or more, the processor 250 may select at least one image including the same looking face as at least one candidate image.

In an embodiment, the processor 250 may select at least one image as at least one candidate image from one or more images stored in the memory 240, by combining the number of times in which an image is displayed through the display 230 while a gallery application is running, whether a designated function has been performed on an image (and/or the number of times in which the designated function has been performed), whether an image has been shared with an external electronic device (and/or the number of times in which the electronic device 101 has shared an image with the external electronic device), whether at least some of one or more images stored in the memory 240 include the same looking face, and the number of at least one image including the same looking face obtained within a designated period.

In an embodiment, the processor 250 may set priority on the number of times in which an image is displayed through the display 230 while a gallery application is running, whether a designated function has been performed on an image (and/or the number of times in which the designated function has been performed), whether an image has been shared with an external electronic device (and/or the number of times in which the electronic device 101 has shared an image with the external electronic device), whether at least some of one or more images stored in the memory 240 include the same looking face, and the number of at least one image including the same looking face obtained within a designated period. The processor 250 may select at least one image (e.g., a designated number of images high in priority) among one or more images stored in the memory 240, as at least one candidate image.

In operation 505, according to an embodiment, the processor 250 may determine whether the face included in at least one candidate image corresponds to the designated face.

In an embodiment, the processor 250 may detect a face (e.g., an area including the face in the image, an image portion for the face in the image, or an object representing the face in the image) from each of the at least one candidate image. The processor 250 may extract feature points in the detected face. The processor 250 may obtain vectors (or also denoted as 'feature vectors') individually corresponding to the extracted feature points by normalizing the face based on the extracted feature points. In an embodiment, the processor 250 may perform the above-described operations based on an artificial intelligence model or a designated algorithm.

In an embodiment, the processor 250 may determine whether the face included in at least one candidate image corresponds to a designated face by comparing the designated face (e.g., a face designated by the face designation unit 311) and the face included in at least one candidate image. For example, the processor 250 may calculate similarities between feature points (e.g., feature vectors) of the designated face and the feature points of the face included in at least one candidate image. When the calculated similarity is a designated threshold or more, the processor 250 may determine that the face included in the at least one candidate image corresponds to the designated face (e.g., determine that the figure with the face included in the at least one candidate image and the figure with the designated face are the same). When the calculated similarity is less than the designated threshold, the processor 250 may determine that the face included in at least one candidate image does not correspond to the designated face (e.g., determine that the figure with the face included in the at least one candidate image and the figure with the designated face are different).

If it is determined in operation 505 that the face corresponding to the at least one candidate image does not correspond to the designated face, in an embodiment, the processor 250 may perform operation 503. For example, when the face included in at least one candidate image is determined not to correspond to the designated face, the processor 250 may again perform the operation of selecting at least one candidate image including a face, from among one or more images stored in the memory 240 (e.g., one or more images stored in the memory 240 except for the at least one candidate image including the face determined not to correspond to the designated face). However, without limited thereto, in an embodiment, when the face included in at least one candidate image is determine not to correspond to the designated face, the processor 250 may stop the operation of providing an avatar (e.g., the operation of updating the avatar or creating a new avatar) for a designated time. For example, when the face included in at least one candidate image is determined not to correspond to the designated face, the processor 250 may not perform the operation of providing an avatar until a designated number of images are obtained or a designated time elapses.

When it is determined in operation 505 that the face corresponding to at least one candidate image corresponds to the designated face, the processor 250 may determine that the at least one candidate image is at least one image for an avatar in operation 507, in an embodiment. For example, when it is determined that the face corresponding to at least one candidate image corresponds to the designated face, the processor 250 may determine that at least one image including the face corresponding to the designated face is at least one image including the first face corresponding to the designated face.

Figure 6:
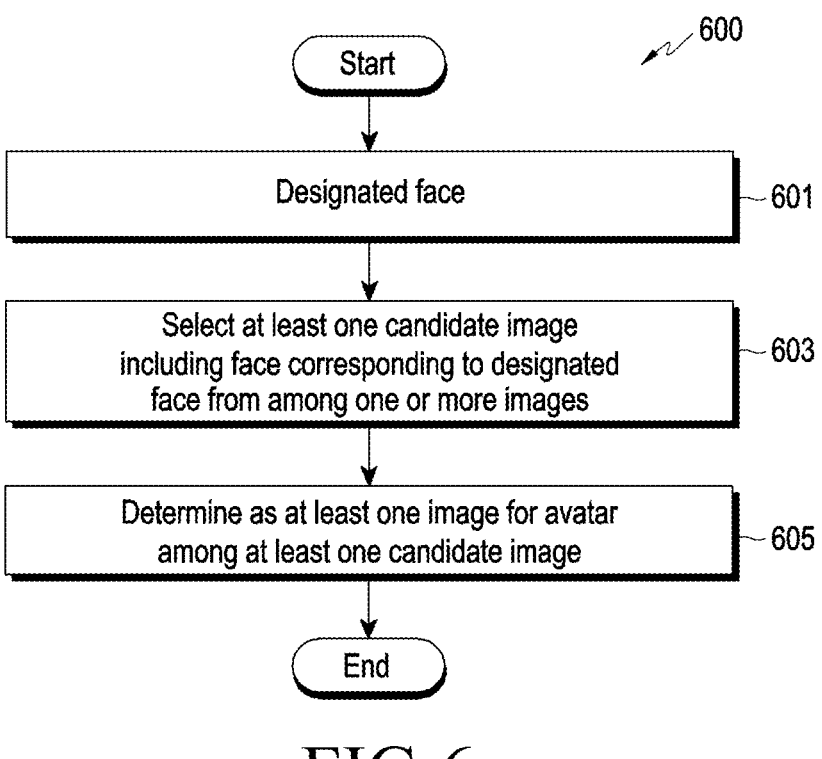
FIG. 6 is a view illustrating a method for determining a sensor's posture according to an embodiment of the disclosure.

FIG. 6 is a view illustrating a method for determining an image for providing an avatar according to an embodiment of the disclosure.

In an embodiment, the operations of FIG. 6 may be operations included in operation 401 of FIG. 4.

Referring to FIG. 6, in a method 600, in operation 601, in an embodiment, the processor 250 may designate a face.

The operation of designating a face by the processor 250 in operation 601 is at least partially identical or similar to operation 501, and no detailed description thereof is given.

In operation 603, in an embodiment, the processor 250 may select at least one candidate image including the face corresponding to a designated face from among one or more images stored in the memory 240.

In an embodiment, the processor 250 may detect a face (e.g., an area including the face in the image, an image portion for the face in the image, or an object representing the face in the image) from each of one or more images stored in the memory 240. The processor 250 may extract feature points in the detected face. The processor 250 may obtain vectors individually corresponding to the extracted feature points by normalizing the face based on the extracted feature points.

In an embodiment, the processor 250 may select at least one candidate image including the face corresponding to the designated face by comparing the designated face (e.g., feature points of the designated face) and faces (e.g., feature points of face) included in one or more images stored in memory 240. For example, the processor 250 may calculate the similarities between the feature points (e.g., feature vectors) of the designated face and the feature points of each of the faces included in one or more images stored in the memory 240. The processor 250 may select at least one candidate image including the face corresponding to the designated face, at least one image for which the similarities with the feature points of the designated face are a designated threshold or more, from among one or more images stored in the memory 240.

In operation 605, in an embodiment, the processor 250 may determine at least one image for an avatar from among at least one candidate image.

In an embodiment, the processor 250 may determine at least one image including the first face corresponding to the designated face by combining the number of times in which an image is displayed through the display 230 while a gallery application is running, whether a designated function has been performed on an image (and/or the number of times in which the designated function has been performed), whether an image has been shared with an external electronic device (and/or the number of times in which the electronic device 101 has shared an image with the external electronic device), whether at least some of one or more images stored in the memory 240 include the same looking face, and the number of at least one image including the same looking face obtained within a designated period.

Returning to FIG. 4, in operation 403, in an embodiment, the processor 250 may obtain first values of a plurality of attributes related to the first face.

In an embodiment, the processor 250 may obtain (e.g., detect) the values of the plurality of attributes (e.g., values indicated by the plurality of attributes) of the elements constituting the face, in at least one image including the first face.

In an embodiment, the plurality of attributes related to the elements constituting the face may be attributes commonly included in a human face (hereinafter, denoted as a 'plurality of internal attributes'). For example, the plurality of internal may include the shape, size, color (e.g., the color of the elements constituting the face, the skin color, and/or the color of the iris) of the elements (e.g., the face shape (contour of the face), eyes, nose, ears, mouth, chicks, chin, forehead, back of head, temporal regions, hair, mustache, spots, wearable items (e.g., glasses, sun glasses, or hat), hat, eyebrows, age, gender, and/or race) constituting the face (or the shape of the face), relative positions of the elements constituting the face, and/or relative size proportions of the elements constituting the face.

In an embodiment, the processor 250 may obtain the values of a plurality of internal attributes in at least one image including the first face, using an artificial intelligence model or a designated algorithm.

In operation 405, in an embodiment, the processor 250 may compare first values of a plurality of attributes related to the first face and second values of a plurality of attributes corresponding to graphic objects constituting the avatar stored in the memory 240.

In an embodiment, the processor 250 may compare, for each attribute, the first values of a plurality of attributes related to the first face included in at least one image including the first face and the second values of a plurality of attributes corresponding to graphic objects constituting an avatar (e.g., an avatar updated most recently or a newly created avatar) stored in the memory 240.

In an embodiment, the processor 250 may calculate differences between the first values of the plurality of attributes related to the first face included in at least one image including the first face and the second values of the plurality of attributes corresponding to the graphic objects constituting the avatar stored in the memory 240, for each attribute.

In operation 407, in an embodiment, the processor 250 may identify whether there is at least one first attribute having a value for which the differences from the second values of the plurality of attributes corresponding to graphic objects constituting the avatar stored in the memory 240 among the first values of the plurality of attributes related to the first face, are the threshold or more, among the plurality of attributes related to the first face.

In an embodiment, the processor 250 may identify whether each of the differences between the first values of the plurality of attributes related to the first face included in the at least one image including the first face and the second values of the plurality of attributes corresponding to the graphic objects constituting the avatar stored in the memory 240 is the designated threshold or more.

In an embodiment, the processor 250 may determine whether to reuse at least some of the values of the plurality of attributes corresponding to the graphic objects constituting the avatar stored in the memory 240, based on whether each of the calculated differences is the designated threshold or more. For example, the processor 250 may identify at least one first attribute, for which differences from the second values of the plurality of attributes corresponding to graphic objects constituting the avatar stored in the memory 240, among the first values of the plurality of attributes related to the first face, are the designated threshold or more, and/or at least one second attribute, for which differences from the values of the plurality of attributes corresponding to the graphic objects constituting the avatar stored in the memory 240 are less than the designated threshold.

In an embodiment, the processor 250 may determine not to reuse the graphic object of the avatar stored in the memory 240, corresponding to at least one first attribute to update the avatar or create a new avatar for the at least one first attribute. For example, the processor 250 may determine to use the first value of the at least one first attribute related to the first face to update the avatar or create a new avatar. In an embodiment, the processor 250 may set a flag value indicate to reuse the first value of the at least one first attribute related to the first face to update the avatar or create a new avatar (e.g., set the flag value corresponding to the at least one first attribute to '0').

In an embodiment, the processor 250 may determine to reuse the graphic object of the avatar stored in the memory 240, corresponding to at least one second attribute, for the at least one second attribute. For example, to update the avatar, the processor 250 may determine to reuse the graphic object of the avatar stored in the memory 240, corresponding to at least one second attribute, without using the first value of the at least one second attribute related to the first face. In an embodiment, to update the avatar, if the first value of the at least one second attribute related to the first face is not used, the operation of matching (e.g., mapping) the value of at least one second attribute related to the first face to the graphic object (e.g., the size, shape, and/or color of the graphic object corresponding to the at least one second attribute among the plurality of graphic objects constituting the avatar) constituting the avatar may be skipped. In an embodiment, to update the avatar, if the value of the second attribute related to the first face is not used, although the avatar stored in the memory 240 is updated, the graphic object corresponding to the at least one second attribute in the updated avatar may not be updated. In an embodiment, the processor 250 may set a flag value indicating to reuse the graphic object of the avatar stored in the memory 240, corresponding to the at least one second attribute, for the at least one second attribute (e.g., set the value of the flag corresponding to the at least one second attribute to '1').

In operation 409, in an embodiment, when it is identified that there is at least one first attribute among the plurality of attributes related to the first face, the processor 250 may update the avatar stored in the memory 240 based on the value (e.g., the first value of the at least one first attribute) of the at least one first attribute.

In an embodiment, when some of the plurality of attributes related to the first face correspond to the at least one first attribute, the processor 250 may determine to perform the operation of updating the avatar. When some of the values of the flags individually corresponding to the plurality of attributes related to the first face are set to '0,' the processor 250 may determine to perform the operation of updating the avatar.

In an embodiment, when it is determined to perform the operation of updating the avatar, the processor 250 may update the avatar stored in the memory 240. In an embodiment, the processor 250 may update at least one first attribute among the plurality of attributes related to the first face (e.g., at least one attribute, for which the differences from the second values of the plurality of attributes corresponding to the graphic objects constituting the avatar stored in the memory 240, among the first values of the plurality of attributes related to the first face, are the designated threshold or more). In an embodiment, the processor 250 may not update at least one second attribute among the plurality of attributes related to the first face (e.g., attributes having the first value, for which the differences from the second values of the plurality of attributes corresponding to the graphic objects constituting the avatar stored in the memory 240 are less than the designated threshold).

In an embodiment, the processor 250 may obtain a graphic object (graphic object is also denoted as an 'asset') corresponding to (e.g., mapped to) the first value of at least one first attribute of the first face, from the memory 240.

In an embodiment, the processor 250 may update the avatar stored in the memory 240 by merging the graphic object having the size, shape, and/or color corresponding to the first value of the at least one first attribute of the first face and the graphic object corresponding to the remaining attributes except for the at least one first attribute among the plurality of graphic objects constituting the avatar stored in the memory 240. In an embodiment, the processor 250 may update the avatar stored in the memory 240 by replacing (or changing to) the graphic object corresponding to the at least one first attribute among the plurality of graphic objects constituting the avatar stored in the memory 240, with the graphic object having the size, shape, and/or color corresponding to the first value of the at least one first attribute of the first face.

In an embodiment, when all of the plurality of attributes related to the first face correspond to the at least one first attribute (e.g., when it is determined to reuse none of the plurality of attributes related to the first face by the reuse unit 317), the processor 250 may determine to perform the operation of creating a new avatar. When the values of the flags individually corresponding to the plurality of attributes related to the first face all are set to '0,' the processor 250 may determine to perform the operation of creating a new avatar.

In an embodiment, when it is determined to perform the operation of creating a new avatar, the processor 250 may create a new avatar. In an embodiment, the processor 250 may obtain a plurality of graphic objects individually corresponding to the values of the plurality of attributes related to the first face, from the memory 240.

In an embodiment, the processor 250 may create a new avatar by merging the plurality of graphic objects having the size, shape, and/or color, individually corresponding to the first values of the plurality of attributes related to the first face.

In an embodiment, when all of the plurality of attributes related to the first face correspond to the at least one second attribute (e.g., when it is determined to reuse the plurality of attributes related to the first face), the processor 250 may determine to maintain the avatar stored in the memory 240. When the values of the flags individually corresponding to the plurality of attributes related to the first face all are set to '1,' the processor 250 may determine to maintain the avatar stored in the memory 240. In an embodiment, when it is determined to maintain the avatar stored in the memory 240, the processor 250 may not perform the operation of providing an avatar until before a designated number of images are obtained in addition to the currently stored images or a designated time elapses. In an embodiment, when it is determined to maintain the avatar stored in the memory 240, the processor 250 may again (e.g., repetitively) perform the remaining operations except for the operation of designating the face among the operations of providing the avatar, among the one or more image stored in the memory 240 (e.g., one or more images stored in the memory 240 except for the at least one image including the first face).

In an embodiment, when the avatar is updated or a new avatar is created, the processor 250 may store the updated avatar or created avatar in the memory 240.

Figure 7:
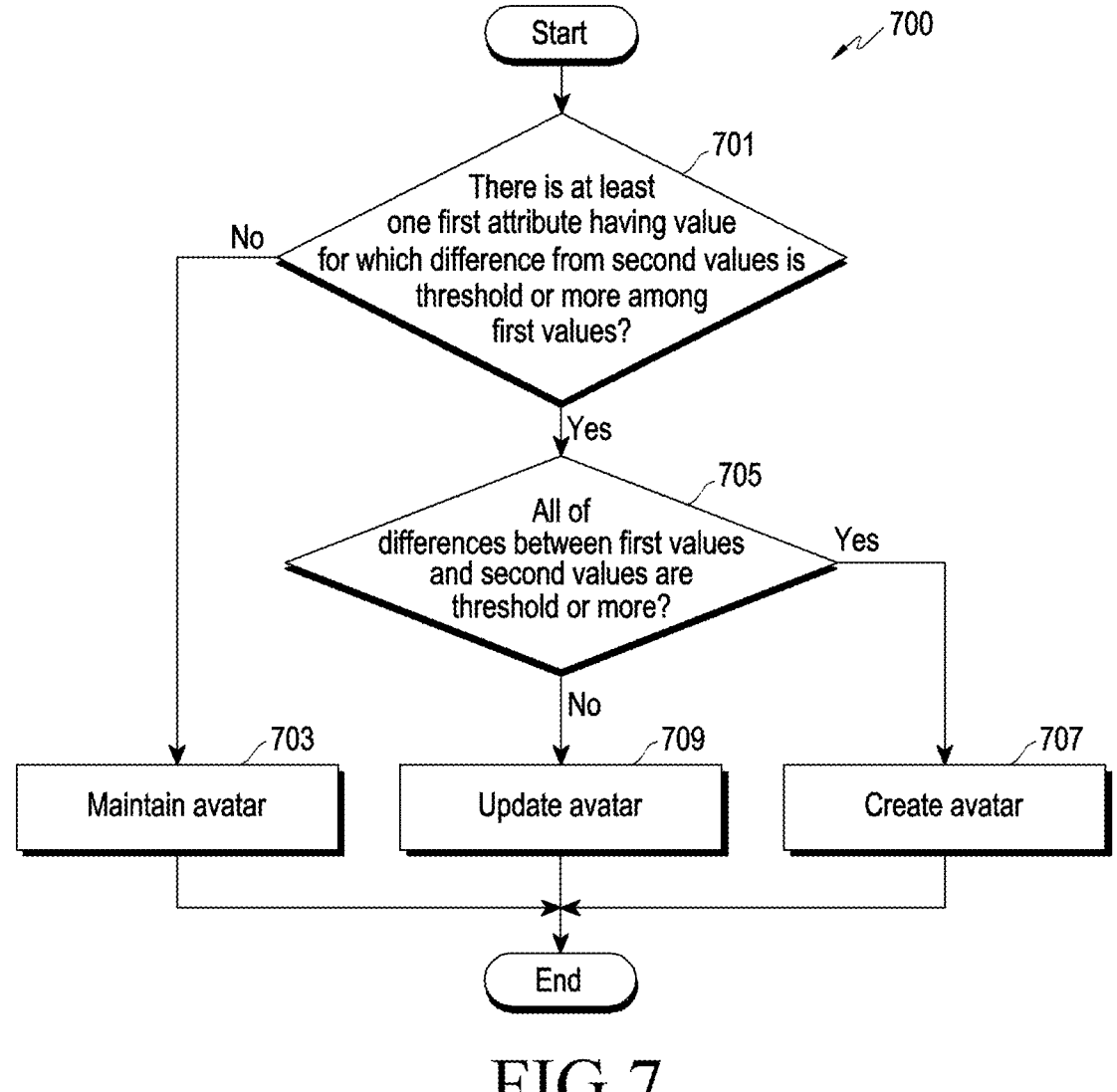
FIG. 7 is a flowchart illustrating a method for providing an avatar according to an embodiment of the disclosure.

FIG. 7 is a flowchart illustrating a method for providing an avatar according to an embodiment of the disclosure.

In an embodiment, the operations of FIG. 7 may be operations included in operations 407 and 409 of FIG. 4.

Referring to FIG. 7, in a method 700, in operation 701, in an embodiment, the processor 250 may identify whether there is at least one first attribute having a value for which the differences from the second values of the plurality of attributes corresponding to graphic objects constituting the avatar stored in the memory 240 among the first values of the plurality of attributes related to the first face, are the threshold or more, among the plurality of attributes related to the first face.

When it is identified in operation 701 that there is not at least one first attribute, the processor 250 may maintain the avatar stored in the memory 240, in operation 703, in an embodiment. For example, when all of the plurality of attributes related to the first face correspond to the at least one second attribute (e.g., when it is determined to reuse the plurality of attributes related to the first face), the processor 250 may determine to maintain the avatar stored in the memory 240. When the values of the flags individually corresponding to the plurality of attributes related to the first face all are set to '1,' the processor 250 may determine to maintain the avatar stored in the memory 240. In an embodiment, when it is determined to maintain the avatar stored in the memory 240, the processor 250 may maintain the avatar stored in the memory 240.

When it is identified in operation 701 that there is the at least one first attribute, the processor 250 may identify whether the differences between the first values of the plurality of attributes related to the first face and the second values of the plurality of attributes corresponding to the graphic objects constituting the avatar stored in the memory 240 are all equal to or larger than the threshold, in operation 705, in an embodiment.

When it is identified in operation 705 that the differences between the first values of the plurality of attributes related to the first face and the second values of the plurality of attributes corresponding to the graphic objects constituting the avatar stored in the memory 240 are all equal to or larger than the threshold, the processor 250 may create a new avatar in operation 707, in an embodiment.

When it is identified in operation 705 that some of the differences between the first values of the plurality of attributes related to the first face and the second values of the plurality of attributes corresponding to the graphic objects constituting the avatar stored in the memory 240 are the threshold or more, the processor 250 may update the avatar stored in the memory 240 in operation 707, in an embodiment.

Since the operation of creating a new avatar in operation 707 and the operation of updating the avatar in operation 709 have been described above in connection with operation 409 of FIG. 4, no detailed description thereof is given.

Figure 8:
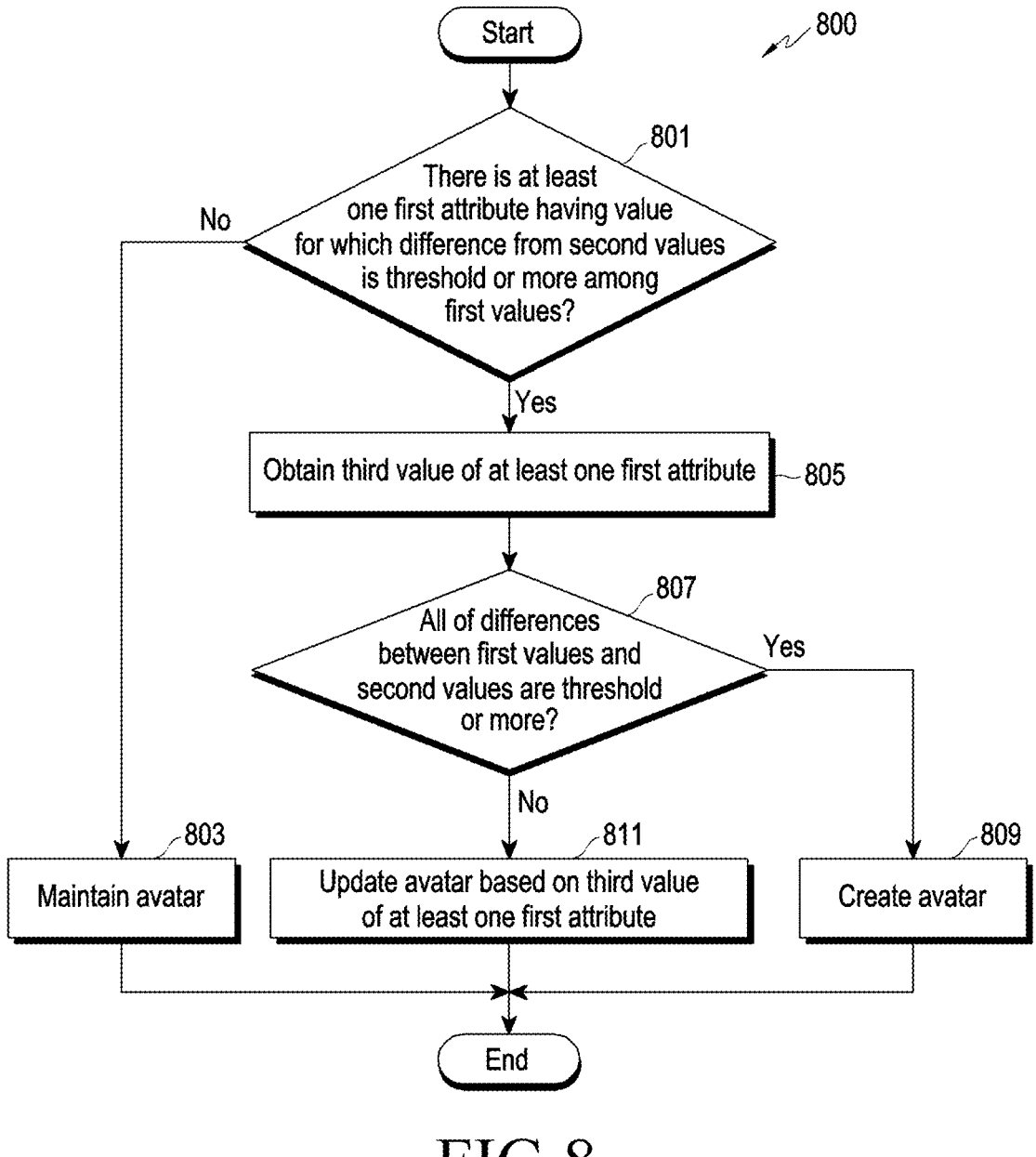
FIG. 8 is a flowchart illustrating a method for providing an avatar according to an embodiment of the disclosure.

FIG. 8 is a flowchart illustrating a method for providing an avatar according to an embodiment of the disclosure.

In an embodiment, the operations of FIG. 8 may be operations included in operations 407 and 409 of FIG. 4.

Referring to FIG. 8, in a method 800, in operation 801, in an embodiment, the processor 250 may identify whether there is at least one first attribute having a value for which the differences from the second values of the plurality of attributes corresponding to graphic objects constituting the avatar stored in the memory 240 among the first values of the plurality of attributes related to the first face, are the threshold or more, among the plurality of attributes related to the first face.

When it is identified in operation 801 that there is not at least one first attribute, the processor 250 may maintain the avatar stored in the memory 240, in operation 803, in an embodiment.

When it is identified in operation 801 that there is the at least one first attribute, the processor 250 may obtain a third value (e.g., a value obtained through the high performance detection unit 318), as a more detailed value of the at least one first attribute, in operation 805, in an embodiment.

In an embodiment, the processor 250 (e.g., the high performance detection unit 318) may obtain (e.g., detect) a more detailed value of the at least one first attribute, for which the differences from the values of the plurality of attributes corresponding to the graphic objects constituting the avatar stored in the memory 240 are the designated threshold or more, among the values of the plurality of attributes related to the first face. For example, the processor 250 (e.g., the high performance detection unit 318) may obtain the third value, as the more detailed value of the at least one first attribute, using an artificial intelligence model or algorithm capable of obtaining a more detailed value of an attribute (or having better performance), as compared with the artificial intelligence model or algorithm used to obtain the first values of the plurality of attributes related to the first face by the face attribute detection unit 315. For example, the processor 250 (e.g., the high performance detection unit 318) may obtain the third value of the at least one first attribute, using an artificial intelligence model implemented with more hidden layers and/or nodes than the hidden layers and/or nodes of the artificial intelligence model used to obtain the first values of the plurality of attributes related to the first face by the processor 250 (e.g., the face attribute detection unit 315).

In operation 807, in an embodiment, the processor 250 may identify whether the differences between the first values of a plurality of attributes related to the first face and the second values of a plurality of attributes corresponding to graphic objects constituting the avatar stored in the memory 240 are the threshold or more.

When it is identified in operation 807 that the differences between the first values of the plurality of attributes related to the first face and the second values of the plurality of attributes corresponding to the graphic objects constituting the avatar stored in the memory 240 are all equal to or larger than the threshold, the processor 250 may create a new avatar in operation 809, in an embodiment. For example, when it is identified that the differences between the first values of the plurality of attributes related to the first face and the second values of the plurality of attributes corresponding to the graphic objects constituting the avatar stored in the memory 240 are all equal to or larger than the threshold, the processor 250 may create a new avatar based on the detailed values (e.g., the third values obtained through operation 805) of the plurality of attributes related to the first face. However, without limited thereto, e.g., when it is identified that all of the differences between the first values of the plurality of attributes related to the first face and the second values of the plurality of attributes corresponding to the graphic objects constituting the avatar stored in the memory 240 are the threshold or more, the processor 250 may create a new avatar based on the first values (e.g., the first values obtained through operation 403) of the plurality of attributes related to the first face.

When it is identified in operation 807 that some of the differences between the first values of the plurality of attributes related to the first face and the second values of the plurality of attributes corresponding to the graphic objects constituting the avatar stored in the memory 240 are the threshold or more, the processor 250 may update the avatar stored in the memory 240 based on the third value of the at least one first attribute in operation 811, in an embodiment.

Figure 9:
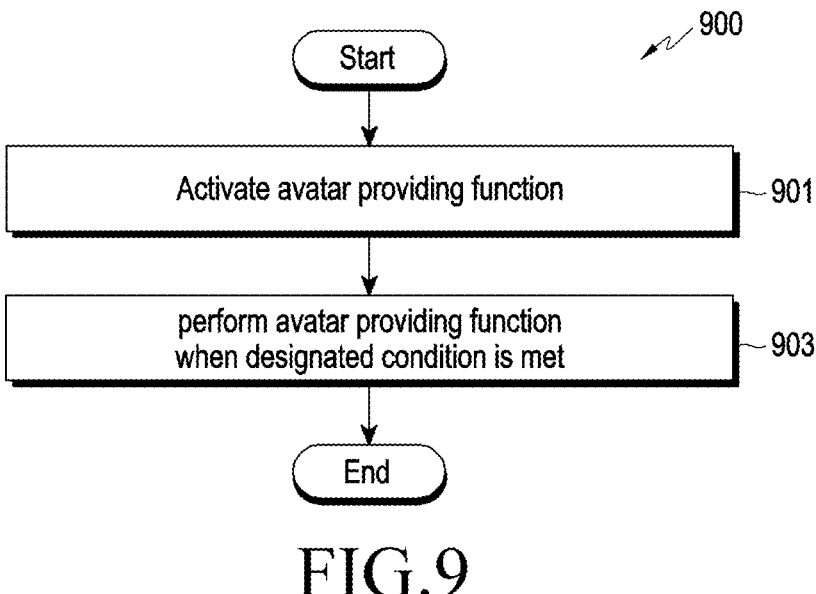
FIG. 9 is a flowchart illustrating a method for performing a function for providing an avatar according to an embodiment of the disclosure.

FIG. 9 is a flowchart 900 illustrating a method for performing a function for providing an avatar according to an embodiment of the disclosure.

Referring to FIG. 9, in operation 901, in an embodiment, the processor 250 may active the avatar providing function. For example, the processor 250 may execute an application for providing an avatar based on a user input.

In an embodiment, the processor 250 may designate a face for providing an avatar based on a user input. In an embodiment, when a face for providing an avatar has already been designated before activating the avatar providing function (e.g., when there is an existing face already designated), the processor 250 may skip the operation of designating a face for providing an avatar based on a user input (e.g., the operation of re-designating a face for providing an avatar).

In an embodiment, when a face for providing an avatar is designated, the designation of the designated face may be maintained until before a user input (e.g., a user input for designating another user's face (or the user's other face)) is made. For example, when a face for providing an avatar is designated, the face designation unit 311 may perform the operation for providing an avatar using the designated face until before a user input for selecting a representative image including another user's face is made to designate the other user's face (or the user's other face).

In operation 903, in an embodiment, the processor 250 may provide the avatar providing function when a designated condition is met (e.g., whether the current battery level of the electronic device 101 is a designated level or more, whether the electronic device 101 is currently being charged, whether the screen of the electronic device 101 is in an active state, the number of images obtained after a designated time, and/or a designated time).

In an embodiment, the processor 250 may perform the avatar providing function based on whether the current battery level of the electronic device 101 is a designated level or more. For example, the processor 250 may identify whether the current battery level of the electronic device 101 is the designated level or more. When the current battery level of the electronic device 101 is the designated level or more, the processor 250 may perform the avatar providing function in the background (or automatically or without a user input). When the current battery level of the electronic device 101 is less than the designated level, the processor 250 may not perform the avatar providing function (or temporarily stop the avatar providing function).

In an embodiment, the processor 250 may perform the avatar providing function based on whether the electronic device 101 is currently being charged (e.g., whether the electronic device 101 is connected to a charger). For example, the processor 250 may identify whether the electronic device 101 is currently being charged. When the electronic device 101 is currently being charged, the processor 250 may perform the avatar providing function in the background. Unless the electronic device 101 is currently being charged, the processor 250 may not perform the avatar providing function.

In an embodiment, the processor 250 may perform the avatar providing function based on whether the screen of the electronic device 101 is in an active state (e.g., whether a charger is connected to the electronic device 101). For example, the processor 250 may identify whether the screen of the electronic device 101 is currently in the active state (e.g., a screen-on state). When the screen of the electronic device 101 is currently in the active state, the processor 250 may perform the avatar providing function in the background. Unless the screen of the electronic device 101 is currently in the active state (e.g., when the screen is in off state), the processor 250 may not provide the avatar providing function.

In an embodiment, the processor 250 may perform the avatar providing function based on the number of images obtained after a designated time. For example, the processor 250 may identify whether the number of images obtained after a designated time (e.g., the time when the avatar is updated or a new avatar is created) is a designated number or more. When the number of images obtained after the designated time is the designated number or more, the processor 250 may perform the avatar providing function in the background. When the number of images obtained after the designated time is less than the designated number, the processor 250 may not perform the avatar providing function.

In an embodiment, the processor 250 may perform the avatar providing function based on a designated time. For example, the processor 250 may identify whether a designated time (e.g., one week or month) elapses from a designated time (e.g., when the avatar is updated or a new avatar is created). When the designated time elapses from the designated time, the processor 250 may perform the avatar providing function in the background. Unless the designated time elapses from the designated time, the processor 250 may not perform the avatar providing function. In an embodiment, the processor 250 may perform the avatar providing function in the background every time period.

In an embodiment, the processor 250 may provide the avatar providing function based on whether the current battery level of the electronic device 101 is a designated level or more, whether the electronic device 101 is currently being charged, whether the screen of the electronic device 101 is in an active state, the number of images obtained after a designated time, and/or a designated time.

In an embodiment, the processor 250 may provide an avatar currently representing the user's appearance by performing the remaining operations, in the background, except for the operation of designating the face based on a user input among the operations for performing the avatar providing function.

Figure 10:
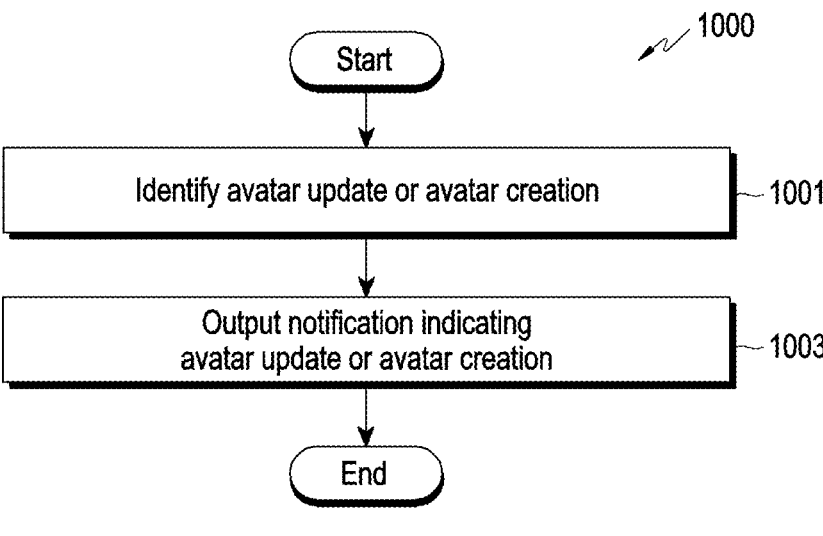
FIG. 10 is a flowchart illustrating a method for providing a notification related to an avatar according to an embodiment of the disclosure.

FIG. 10 is a flowchart 1000 illustrating a method for providing a notification related to an avatar according to an embodiment of the disclosure.

Referring to FIG. 10, in operation 1001, in an embodiment, the processor 250 may identify an avatar update or avatar creation. For example, the processor 250 may update the avatar or create a new avatar in the background. The processor 250 may store the updated avatar or the newly created avatar in the memory 240.

In operation 1003, in an embodiment, the processor 250 may output a notification indicating an avatar update or avatar creation. For example, when the avatar is updated or a new avatar is created, the processor 250 may display the notification for the avatar update or avatar creation through the display 230. As another example, when the avatar is updated or a new avatar is created, the processor 250 may output an audio and/or vibration indicating the avatar update or avatar creation. However, the notification for the avatar update or avatar creation is not limited to the above-described examples.

Although not shown in FIG. 10, in an embodiment, if an application for providing an avatar is executed by the user after the avatar is updated or a new avatar is created, the processor 250 may display the updated avatar or newly created avatar through the display 230.

Figure 11A:
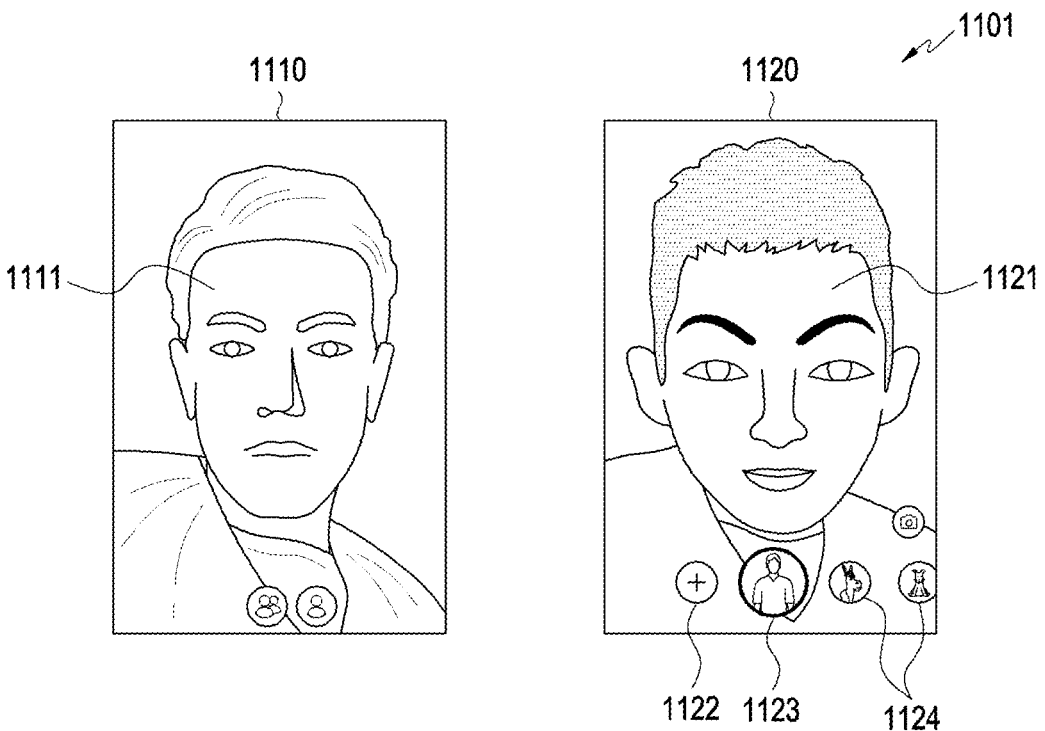
FIGS. 11A and 11B are views illustrating examples of a method for providing an avatar according to various embodiments of the disclosure.
Figure 11B:
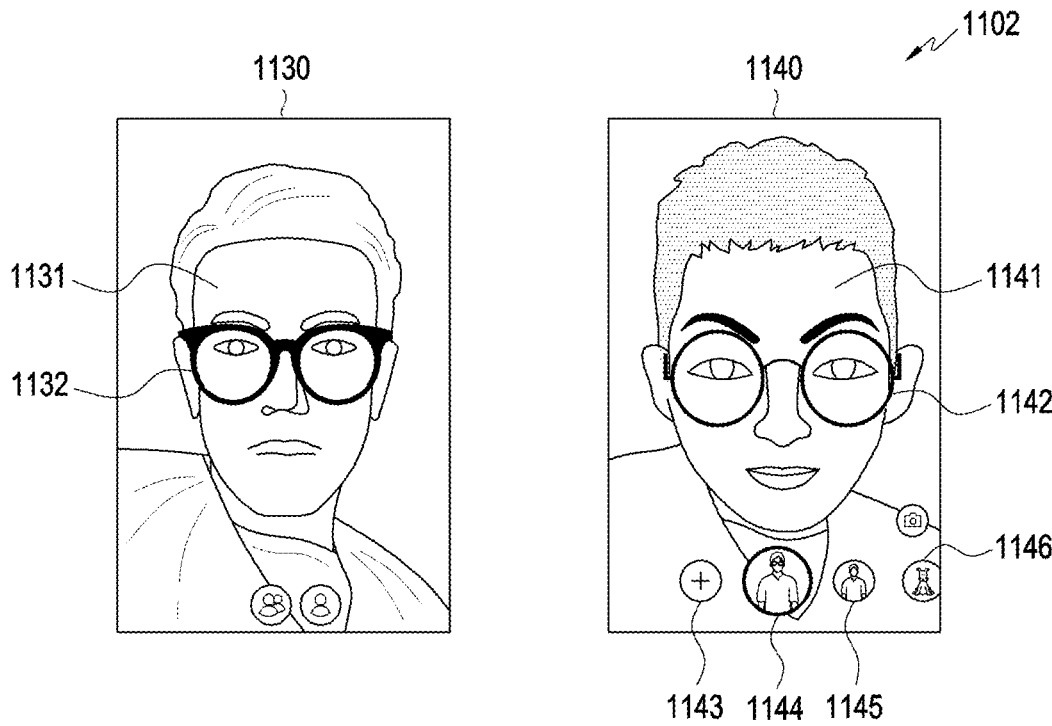

FIGS. 11A and 11B are views 1101 and 1102 illustrating examples of a method for providing an avatar according to various embodiments of the disclosure.

Referring to FIGS. 11A and 11B, in an embodiment, FIG. 11A may depict an image 1110 and an image 1120 including an avatar 1121 obtained based on the image 1110. In an embodiment, the processor 250 may create (or update) the avatar 1121 based on the face 1111 included in the image 1110. In an embodiment, the processor 250 may display, through the display 230, an object 1122 for providing an additional avatar, a thumbnail image 1123 of the image 1120, and/or objects 1124 representing avatars provided as default by the avatar providing application, along with the image 1120.

In an embodiment, FIG. 11B may depict an image 1130 obtained after the image 1120 including the avatar 1121 is obtained based on the image 1110 and an image 1140 including an avatar 1141 obtained based on the image 1130.

In an embodiment, the image 1130 may be an image reflecting the user's current (or latest) appearance. For example, as compared with the image 1110, the image 1130 may represent the user wearing glasses 1131. In an embodiment, the processor 250 may update the avatar 1121 included in the image 1120. For example, the processor 250 may compare, per attribute, the values of the plurality of attributes related to the face 1111 and the values of the attributes of the plurality of graphic objects constituting the avatar 1121. The processor 250 may update the avatar 1121 with the avatar 1141 including the graphic object 1142 corresponding to the glasses 1131, based on the per-attribute comparison.

In an embodiment, the processor 250 may display, through the display 230, an object 1143 for providing an additional avatar, a thumbnail image 1144 of the image 1140, a thumbnail 1145 of an image including an avatar obtained before, and/or an object 1146 representing the avatar provided as default by the avatar providing application, along with the image 1140.

According to various embodiments of the disclosure, a method for providing an avatar in an electronic device 101 may comprise determining at least one image including a first face corresponding to a designated face, among one or more images stored in a memory 240 of the electronic device 101, obtaining first values of a plurality of attributes related to the first face, comparing, for each attribute, the first values of the plurality of attributes related to the first face and second values of a plurality of attributes corresponding to graphic objects constituting an avatar, the graphic objects being stored in the memory 240, identifying whether at least one first attribute exists among the plurality of attributes related to the first face, the at least one first attribute having a first value among the first values, a difference between the first value and a second value of the at least one first attribute being equal to or greater than a threshold, the second value being included the second values, and based on identifying that at least one first attribute exists among the plurality of attributes related to the first face, updating the avatar, based on the first value of the at least one first attribute.

According to various embodiments, updating the avatar may include updating the avatar, based on the first value of the at least one first attribute, the avatar, based on the at least one first attribute being a portion of the plurality of attributes related to the first face.

According to various embodiments, updating the avatar may include creating a new avatar, based on each of differences between the first values and the second values being equal to or greater than the threshold.

According to various embodiments, updating the avatar may include maintaining the avatar, based on each of differences between the first values and the second values being less than the threshold.

According to various embodiments, the method may further comprise obtaining a detailed value of the at least one first attribute, based on identifying that the at least one first attribute exists among the plurality of attributes related to the first face and updating the avatar, based on the detailed value of the at least one first attribute.

According to various embodiments, the method may further comprise displaying a representative image including a face of a user of the electronic device through a display 230 of the electronic device 101 and designating the face included in the representative image as the designated face, based on a user input to the representative image.

According to various embodiments, determining the at least one image may include selecting at least one candidate image among the one or more images stored in the memory 240, based on a number of times by which an image is displayed through a display 230 of the electronic device 101 while a gallery application is executed, whether a function designated for an image has been performed, whether an image has been shared with an external electronic device 101, whether at least some of the one or more images stored in the memory 240 include a same looking face, and/or a number of at least one image including a same looking face obtained within a designated period, detecting a face in the at least one candidate image, and determining the at least one image by comparing the first face corresponding to the designated face and the detected face.

According to various embodiments, determining the at least one image may include selecting at least one candidate image corresponding to the designated face among the one or more images stored in the memory 240 and determining the at least one image among the at least one candidate image, based on a number of times by which an image is displayed through a display 230 of the electronic device 101 while a gallery application is executed, whether a function designated for an image has been performed, whether an image has been shared with an external electronic device 101, whether at least some of the one or more images stored in the memory 240 include a same looking face, and/or a number of at least one image including a same looking face obtained within a designated period.

According to various embodiments, the method may further comprise performing a function of providing the avatar in a background, based on whether a current battery level of the electronic device 101 is equal to or greater than a designated level, whether the electronic device 101 is currently being charged, whether a screen of the electronic device 101 is in an active state, a number of images obtained after a designated time, and/or a designated time.

According to various embodiments, the method may further comprise outputting a notification indicating the avatar is updated, based on the avatar being updated.

Further, the structure of the data used in embodiments of the disclosure may be recorded in a computer-readable recording medium via various means. The computer-readable recording medium includes a storage medium, such as a magnetic storage medium (e.g., a read only memory (ROM), a floppy disc, or a hard disc) or an optical reading medium (e.g., a CD-ROM or a digital versatile disc (DVD)).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:

at least one processor; and memory storing instructions that, when executed by the at least one processor individually or collectively, cause the electronic device to:

determine at least one first image including a first face of a user, obtain first values of a plurality of attributes related to the first face, compare, for each attribute, the first values of the plurality of attributes related to the first face with second values of a plurality of attributes corresponding to graphic objects included in a first avatar which has been created based on an image including the first face of the user, and create a new avatar based on comparing, for each attribute, a threshold corresponding to that attribute and a difference between the first values and the second values.

2. The electronic device of claim 1, wherein the instructions, when executed by the at least one processor individually or collectively, further cause the electronic device to:

identify whether at least one first attribute exists among the plurality of attributes related to the first face, the at least one first attribute having a first attribute value among the first values, a difference between the first attribute value and a second attribute value of the at least one first attribute being equal to or greater than a first threshold, the second attribute value being included in the second values, and update the first avatar based on the difference between the first attribute value and the second attribute value.

3. The electronic device of claim 2, wherein the first avatar is updated based on the first attribute value of the at least one first attribute incase that the at least one first attribute exists among the plurality of attributes related to the first face.

4. The electronic device of claim 1, wherein the instructions, when executed by the at least one processor individually or collectively, cause the electronic device to create the new avatar, based on each of differences between the first values and the second values being equal to or greater than the threshold.

5. The electronic device of claim 2, wherein the instructions, when executed by the at least one processor individually or collectively, further cause the electronic device to maintain the first avatar, based on each of differences between the first values and the second values being less than the first threshold.

6. The electronic device of claim 2, wherein the instructions, when executed by the at least one processor individually or collectively, further cause the electronic device to:

obtain a detailed value of the at least one first attribute, based on identifying that the at least one first attribute exists among the plurality of attributes related to the first face, and update the first avatar, based on the detailed value of the at least one first attribute.

7. The electronic device of claim 1, wherein the instructions, when executed by the at least one processor individually or collectively, further cause the electronic device to:

display a representative image including a face of a particular user of the electronic device through a display of the electronic device, and designate the face of the particular user of the electronic device included in the representative image as a designated face, based on a user input to the representative image.

8. The electronic device of claim 1, wherein, to determine the at least one first image, the instructions, when executed by the at least one processor individually or collectively, further cause the electronic device to:

select at least one candidate image among one or more images stored in the memory, based on a number of times by which an image is displayed through a display of the electronic device while a gallery application is executed, whether a function designated for an image has been performed, whether an image has been shared with an external electronic device, whether at least some of the one or more images stored in the memory include a same looking face, and/or a number of images including the same looking face obtained within a designated period, detect a face in the at least one candidate image, and determine the at least one first image by comparing the first face corresponding to a designated face and the detected face in the at least one candidate image.

9. The electronic device of claim 1, wherein, to determine the at least one first image, the instructions, when executed by the at least one processor individually or collectively, further cause the electronic device to:

select at least one candidate image corresponding to a designated face among one or more images stored in the memory, and determine the at least one first image among the at least one candidate image, based on a number of times by which an image is displayed through a display of the electronic device while a gallery application is executed, whether a function designated for an image has been performed, whether an image has been shared with an external electronic device, whether at least some of the one or more images stored in the memory include a same looking face, and/or a number of images including the same looking face obtained within a designated period.

10. The electronic device of claim 1, wherein the instructions, when executed by the at least one processor individually or collectively, further cause the electronic device to perform a function of providing the new avatar in a background, based on whether a current battery level of the electronic device is equal to or greater than a designated level, whether the electronic device is currently being charged, whether a screen of the electronic device is in an active state, a number of images obtained after a designated time, and/or the designated time.

11. A method performed by an electronic device, the method comprising:

determining at least one first image including a first face of a user;

obtaining first values of a plurality of attributes related to the first face;

comparing, for each attribute, the first values of the plurality of attributes related to the first face with second values of a plurality of attributes corresponding to graphic objects included in a first avatar which has been created based on an image including the first face of the user; and creating a new avatar based on comparing, for each attribute, a threshold corresponding to that attribute and a difference between the first values and the second values.

12. The method of claim 11, further comprising:

identifying whether at least one first attribute exists among the plurality of attributes related to the first face, the at least one first attribute having a first attribute value among the first values, a difference between the first attribute value and a second attribute value of the at least one first attribute being equal to or greater than a first threshold, the second attribute value being included in the second values; and updating the first avatar based on the difference between the first attribute value and the second attribute value.

13. The method of claim 12, wherein the first avatar is updated based on the first attribute value of the at least one first attribute, in case that the at least one first attribute exists among the plurality of attributes related to the first face.

14. The method of claim 11, wherein creating the new avatar comprises creating the new avatar, based on each of differences between the first values and the second values being equal to or greater than a first the threshold.

15. The method of claim 12, further comprising:

maintaining the first avatar, based on each of differences between the first values and the second values being less than the first threshold.

16. The method of claim 12, further comprising:

obtaining a detailed value of the at least one first attribute, based on identifying that the at least one first attribute exists among the plurality of attributes related to the first face; and updating the first avatar, based on the detailed value of the at least one first attribute.

17. The method of claim 11, further comprising:

displaying a representative image including a face of a particular user of the electronic device through a display of the electronic device; and designating the face of the particular user of the electronic device included in the representative image as a designated face, based on a user input to the representative image.

18. The method of claim 11, wherein determining the at least one first image comprises:

selecting at least one candidate image among one or more images stored in memory of the electronic device, based on a number of times by which an image is displayed through a display of the electronic device while a gallery application is executed, whether a function designated for an image has been performed, whether an image has been shared with an external electronic device, whether at least some of the one or more images stored in the memory include a same looking face, and/or a number of images including the same looking face obtained within a designated period;

detecting a face in the at least one candidate image; and determining the at least one first image by comparing the first face corresponding to a designated face and the detected face in the at least one candidate image.

19. The method of claim 11, wherein determining the at least one first image comprises:

selecting at least one candidate image corresponding to a designated face among one or more images stored in memory of the electronic device; and determining the at least one first image among the at least one candidate image, based on a number of times by which an image is displayed through a display of the electronic device while a gallery application is executed, whether a function designated for an image has been performed, whether an image has been shared with an external electronic device, whether at least some of the one or more images stored in the memory include a same looking face, and/or a number of images including the same looking face obtained within a designated period.

20. A non-transitory computer-readable medium having recorded thereon computer executable instructions, the computer executable instructions that, when executed by at least one processor of an electronic device individually or collectively, cause the electronic device to:

determine at least one first image including a first face of a user, obtain first values of a plurality of attributes related to the first face, compare, for each attribute, the first values of the plurality of attributes related to the first face with second values of a plurality of attributes corresponding to graphic objects included in a first avatar which has been created based on an image including the first face of the user, and create a new avatar based on comparing, for each attribute, a threshold corresponding to that attribute and a difference between the first values and the second values.

* * * * *